United States Patent [19]

Stocking et al.

[11] Patent Number: 5,841,655
[45] Date of Patent: Nov. 24, 1998

[54] METHOD AND SYSTEM FOR CONTROLLING ITEM EXPOSURE IN COMPUTER BASED TESTING

[75] Inventors: Martha L. Stocking, Hopewell; Charles Lewis, Skillman, both of N.J.

[73] Assignee: Educational Testing Service, Princeton, N.J.

[21] Appl. No.: 629,365

[22] Filed: Apr. 8, 1996

[51] Int. Cl.⁶ .................................................. G05B 9/02
[52] U.S. Cl. .................... 364/188; 364/300; 364/419.01; 364/419.02
[58] Field of Search ..................... 364/188, 300, 364/419.01, 419.2; 434/1, 10, 306, 307 R, 434, 433, 322; 322/28, 63, 99, 15, 34, 25

[56] References Cited

U.S. PATENT DOCUMENTS

| | | | |
|---|---|---|---|
| 3,077,038 | 2/1963 | Williams et al. | 434/307 R |
| 3,245,157 | 4/1966 | Laviana | 434/307 R |
| 3,401,469 | 9/1968 | Shaver et al. | 434/307 R |
| 3,485,946 | 12/1969 | Jackson et al. | 434/307 R |
| 4,414,629 | 11/1983 | Waite | 364/403 |
| 4,471,348 | 9/1984 | London et al. | 345/2 |
| 4,671,772 | 6/1987 | Slade et al. | 434/219 |
| 4,768,087 | 8/1988 | Taub et al. | 358/84 |
| 4,895,518 | 1/1990 | Arnold et al. | 434/188 |
| 4,973,254 | 11/1990 | Bracconier | 434/342 |
| 4,978,305 | 12/1990 | Kraft | 434/353 |
| 4,996,642 | 2/1991 | Hey | 364/419.2 |
| 5,056,021 | 10/1991 | Ausborn | 364/419.08 |
| 5,059,127 | 10/1991 | Lewis et al. | 434/353 |
| 5,321,611 | 6/1994 | Clarck et al. | 364/419.2 |
| 5,433,615 | 7/1995 | Clark | 434/322 |
| 5,565,316 | 10/1996 | Kershaw et al. | 434/322 |

OTHER PUBLICATIONS

Stocking, Martha L., Three Practical Issues for Modern Adaptive Testing Item Pools, Educational Testing Service, Princeton, N.J. Feb. 1994, 45p.

Stocking, Martha L., Cotrolling Item Exposure Rates in a Realistic Adaptive Testing Paradigm, Educational Testing Service, Princeton, N.J., Jan. 1993, 25p.

Eignor, Daniel R. And Others, Case Studies in Computer Adaptive Test Design through Simulation., Education Testing Service, Princeton, N.J., Nov. 1993, 74p.

Davey and Parshall, "*New Algorithms for Item Selection and Exposure Control with Computerized Adaptive Testing*", Apr. 18–22, 1995.

Eignor, et al., "*Case Studies in Computer Adaptive Test Design Through Simulation,*" 1993.

(List continued on next page.)

*Primary Examiner*—Reba I. Elmore
*Assistant Examiner*—McDievnel Marc
*Attorney, Agent, or Firm*—Woodcock Washburn Kurtz Mackiewicz & Norris LLP

[57] ABSTRACT

A method and system for item exposure control in computer based testing. A set of exposure control parameters representing the probability that an item selected from an item pool is administered to a test taker for each item in the pool is generated through computer based test simulation. The exposure control parameters can be initialized using values less than one that reflect the expected value after the test simulations are complete. The items in the item pool are ordered from most desirable to least desirable to administer based on predefined criteria. The set of exposure control parameters are used to generate operant probabilities associated with each of the items and represent the probability that the item is selected to be administered given that no more desirable item has been administered first. Items are randomly selected to be administered based on their corresponding operant probabilities. Stimuli may be included in the item list, and when randomly selected, the set of items associated with the stimulus are administered. The operant probabilities can be adjusted by item security parameters which are defined based on a desired measure of test security. A system for carrying out the steps includes an exposure control parameter generator, an item selector, and an item administrator.

22 Claims, 9 Drawing Sheets

OTHER PUBLICATIONS

Schaeffer, et al. "*The Introduction and Comparability of the Computer Adaptive GRE General Test,*" Aug., 1995.

Lord, "*A Broad–Range Tailored Test of Verbal Ability*", 1977, pp. 95–100.

McBride and Martin, "*Reliability and Validity of Adaptive Ability Tests in a Military Setting*", 1983, pp. 223–236.

Sheehan and Lewis, "*Computerized Mastery Testing With Nonequivalent Testlets*", 1992, pp. 65–76.

Stocking, "*Controlling Item Exposure Rates in a Realistic Adaptive Testing Paradigm,*" Jan., 1993.

Stocking and Swanson, "*A Method for Severely Constrained Item Selection in Adaptive Testing*", 1993, pp. 277–292.

Stocking and Swanson, "*A Model and Heuristic For Solving Very Large Item Selection Problems*", 1993, pp. 151–166.

Daniel O. Segall, "*CAT–GATB Simulation Studies,*" Dec. 20, 1994.

Wainer, "*Computerized Adaptive Testing A Primer,*" 1990, pp. 121–122.

Stocking, "*Two Simulated Feasibility Studies in Computerised Adaptive Testing,*" 1987 pp. 263–277.

METHOD AND SYSTEM FOR CONTROLLING ITEM EXPOSURE IN COMPUTER BASED TESTING

FIELD OF THE INVENTION

The present invention relates to a method of controlling item exposure in a computer adaptive test, and more particularly, to a method of controlling item exposure through the use of a multinomial procedure.

BACKGROUND OF THE INVENTION

Every year millions of conventional paper-and-pencil tests are administered by various national testing agencies. These tests are typically "high stakes" tests in that important decisions about test-takers are based, in part, on test scores. In secure conventional paper-and-pencil testing, large numbers of candidates take the same or parallel linear test forms at a few fixed administration dates scheduled throughout some time period. "Secure" in this context means that a great deal of time and effort is spent by test agencies to insure that no test-taker has access to test questions in advance of test administration. The frequency with which a single item (i.e., a test question) might be seen by a single test-taker can be tightly controlled in advance of testing through policies that regulate both the reuse of test forms and the frequency with which candidates may retake the test.

Adaptive tests are tests in which items are selected from a large pool of items to be appropriate for a test-taker (the test "adapts" to the test taker). All but a few proposed designs have assumed that items would be chosen and administered to test-takers on a computer, hence the term, computerized adaptive testing (CAT). In an environment where tests are computer administered, it is a natural extension to utilize the computer for administrative activities such as scheduling, score reporting, protecting item security, and so forth.

FIG. 1 shows a general overview of computer based testing. Computerized tests are developed at a central processing site 1. Development of a computerized test includes the creation of various data files by application specific software. The computerized tests are packaged at the central processing site 1 and delivered to one or more test centers 2. Each test center 2 provides at least one workstation 3 on which a computerized test is administered to an examinee. The workstation 3 may be a personal computer equipped with a mouse. A test center 2 may, for example, be located at a school or a dedicated test site. Generally, a test administrator located at the test center 2 loads (or downloads from the central processing site) the computerized test, data files and application software developed at the central processing site 1 onto the hard disk of each workstation 3 at the test center 2. The administrator initiates the delivery of a computerized test to an examinee who is scheduled to take the test. The examinee's responses to questions presented by the test may be stored on a hard disk on each workstation 3 or transmitted back to the central processing site 1 for scoring and evaluation.

In FIG. 1, one central processing site 1, three test centers 2, and 9 workstations 3 apportioned among the test centers 2 are shown. However, it should be understood, that any number test centers 2 and workstations 3 may be used by the computer based testing system.

As noted by Davey & Parshall (1995) high-stakes adaptive testing has at least three goals: 1) to maximize test efficiency by selecting the most appropriate items for a test-taker based on the test taker's previous responses, 2) to assure that the tests measure the same composite of multiple traits for each test-taker by controlling the nonstatistical nature of items included in the test, i.e., satisfy a predefined test specification, and 3) to protect the security of the item pool by controlling the rates at which items can be administered. While these goals often compete with one another, protecting and controlling item security in computer based testing becomes significantly more difficult than in conventional paper and pencil testing. Different approaches to each of the above-noted goals yield different models for adaptive testing.

It should be understood, however, that CAT is by no means the only type of test that is conveniently administered via computers (see for example, Sheehan & Lewis (1992) on computerized mastery testing). It is likely that different types of high-stakes continuous computer administered tests have different kinds of security problems. Accordingly, although the background of the invention will hereinafter be described in connection with CAT, it should be understood that the invention and the claims following the description of the invention are not to be construed as limited to controlling item exposure in CAT except where expressly stated.

In general, any CAT procedure implicitly orders the items in the items pool (a set of preselected items from which certain item are selected for administration during computer based testing) in terms of their desirability for selection as the next item to be administered. Differences in ordering typically reflect particular definitions of item optimality and particular methods of estimating ability. Any attempt to control the exposure of items by selecting items that are deemed less than optimal can then be viewed as modifications imposed on this ordering.

One common approach used in ordering is based on the Weighted Deviations Model (WDM) (see Stocking & Swanson (1993) and Swanson & Stocking (1993)). The WDM ordering explicitly takes into account nonstatistical item properties or features along with the statistical properties of items. This is to insure that each adaptive test produced from a pool matches a set of test specifications and is, therefore, as parallel as possible to any other test in terms of content and type of items, while being tailored to an individual test-taker in terms of appropriateness. The desired balance between measurement and construct concerns is reflected by the weights given to them, which are chosen by the test designer. The WDM approach also allows specification of overlapping items that may not be administered in the same adaptive test. In addition, it is possible to restrict item selection to blocks of items, either because they are associated with a common stimulus (e.g., the text or graph to which a question refers) or common directions or any other feature that test specialists deem important. Thus at each item selection based on the WDM, the pool or an appropriate subset of the pool is ordered from most desirable (smallest weighted deviations from desirable test properties) to least desirable (largest weighted deviations from desirable test properties).

Any scheme that seeks to control the exposure of items employs mechanisms that override the optimal ordering of items, thus degrading the quality of the adaptive test. Longer tests may be used to achieve the level of psychometric efficiency obtained when no exposure control is exercised.

Early procedures for controlling item exposure identified a group of items that were considered roughly equal in optimality and the next item was chosen randomly from that group. For example, the first item to be administered would be chosen randomly from the top five items in the list of items ordered as described above. The second item would be selected randomly from a group of four most desirable items; the third item from a group of three, the fourth from a group of two and the fifth and subsequent items chosen to be optimal. The assumption underlying this approach is that after some number of initial items, test-takers will be sufficiently differentiated so that subsequent items will vary a great deal.

The advantage to these kinds of schemes is that they are simple to implement and easily understood. However, the success of such schemes is difficult to predict with complex but realistic item pool structures and test specifications, and may not prevent overuse of some items. Moreover, it is difficult to determine the best sequence of group sizes from which the random selection is made by anything other than time-consuming trial and error with substantially no certainty of success and with no easy generalization for different item pool and test structures.

Another procedure, called the "INF04" procedure, is described in Segall (1994). According to this procedure, at every item selection, the items in the entire pool are ordered from highest to lowest based on their Fisher item information value at the current level of estimated ability. These values may then be raised to the Nth power (where N is an integer), an ad hoc decision made to emphasize differences in information. A maximum is placed on these values, the values are then normalized to sum to one and a cumulative function is formed. A random number is generated and the location of the corresponding item is found for the value of the random number, interpreted as a cumulative probability. This item then becomes the next item to be administered. If this procedure is used with the WDM, the pool would be ordered not by information, but rather by the desirability criteria incorporating both statistical and nonstatistical item features as described previously.

The INF04 procedure avoids the problem of determining the best sequence of group sizes that characterizes the simple randomization method. It is similar to the simple randomization approach with randomization at every item selection. Also, intrinsic to the INF04 procedure is the implicit dependence of the randomization on the current estimated ability level. However, this scheme does not prevent high exposure rates for some items, as reported in Segall (1994, Table 2.1). In addition, this procedure may depend on the nature of the particular item pool for which it was developed. Thus this procedure may be difficult or impossible to generalize to other item pools.

The two procedures described above attempt to increase item security by indirectly reducing item exposure. Sympson and Hetter (see Wainer, "Computer Adaptive Testing a Primer", pg. 121–122 (1990)) have tackled the issue of controlling item exposure directly in a probabilistic fashion.

This procedure considers a test-taker randomly sampled from a typical group of test-takers and distinguishes between the probability P(S) that an item is selected as the next best item by some CAT procedure and the conditional probability P(A/S) that an item is administered given that it has been selected. The probability P(A/S) associated with a particular item in the pool is referred to herein as that item's exposure control parameter. The procedure seeks to control the overall probability that an item is administered, P(A), where $$P(A)=P(A/S)*P(S) \qquad (1)$$

and to insure that the maximum value for each P(A) is less than a predefined value r. This predefined value r is the desired (not the observed) maximum rate of item usage.

FIG. 2 shows a flow chart for controlling item exposure in accordance with the Sympson and Hetter procedure. The exposure control parameters, $P_i(A/S)$, for each item i in the pool, are determined at step 10 through a series of simulations using an already established adaptive test design and simulees drawn from a typical distribution of ability (this is shown generally in dashed lines as step 30 and is described below in connection with FIG. 3).

Once the exposure control parameters have been established as shown at 12, they are used in item selection during the CAT. All of the items in the item pool are ordered in terms of desirability as described above at step 14. The next best item, the first item listed that has not yet been administered assuming the items are listed from best to worst, is selected at step 16. A random number RN is generated at step 18. If the random number is less than or equal to the exposure control parameter for the selected item, $P_i(A/S)$, as determined at step 20, the selected item is administered and removed from the pool for that test taker at step 24. If the random number is greater than the exposure control parameter, $P_i(A/S)$, for the selected item as determined at step 20, the selected item is not administered and is removed from the pool of remaining items for this test-taker at step 22. This procedure for the next best item remaining in the pool is repeated as shown in FIG. 2 until n items have been administered as shown at step 26, where n is the length of the adaptive test.

If the adaptive test is of length n, then there must be at least n items in the pool with exposure control parameters of one to ensure that at least n items will be administered. When the set of $P_i(A/S)$ do not contain at least n with a value equal to one, Sympson and Hetter suggest the procedure of setting the n highest exposure control parameters to one. This has the effect of increasing the desired exposure rate for the items with an adjusted exposure control parameter which may result in a further departure from the desired test specification.

FIG. 3 shows a flow chart of the procedure used by Sympson and Hetter to define the exposure control parameters. As mentioned above, the exposure control parameters are generated by simulating the adaptive test using the same pool of items to be used during the actual adaptive test. The maximum exposure rate r is preselected at step 32. As the maximum rate of usage r increases, items become more exposed. The set of exposure control parameters for the given item pool are initialized to one at step 34.

The adaptive test is then simulated at step 36 in accordance with steps 14, 16, 18, 20, 22, 24, and 26 shown in FIG. 2. Following each simulation, the proportion of times each item is selected as the best item, $P_i(S)$ is tallied at step 38. If $P_i(S)$ is less than or equal to r as determined at step 40, then $P_i(A/S)$ is set to one for the next iteration at step 44, insuring that $P_i(A)=P_i(A/S)*P_i(S) \leq r$. If $P_i(S)$ is greater than r as determined at step 40, then $P_i(A/S)$ is set to r/P(s) for the next iteration at step 42, again insuring that $P_i(A) \leq r$. The simulations continue until the set of $P_i(A/S)$ has stabilized and the maximum observed $P_i(A)$ for all items is approximately equal to the desired value of r.

While this procedure does control item exposure in a direct fashion, the exposure control parameters do not converge for all adaptive tests and item pools. When the exposure control parameters do not converge, i.e. stabilize so that all $P_i(A)$ are less than or equal to r, either the item pool or adaptive test or both must be modified.

Stocking (1993) extended the Sympson and Hetter approach to item pools with complex structures and adaptive tests with complex test specifications. In these extensions, the basic procedure is applied to blocks of items as well as to stimulus material, which, in general, will have different exposure rates than items associated with stimulus material.

The advantage of the extended Sympson and Hetter approach is that one obtains direct control of the probability that an item is administered, $P_t(A)$, in a typical population of test-takers. However, the simulations required to obtain estimates of the $P_t(A/S)$ for each item are time-consuming for pools and test specifications with complex structures. If an item pool is changed, even by the addition or deletion of a single item, or if the target population changes significantly, the adjustment simulations must be repeated. This problem is compounded when the exposure control parameters of any block of items fail to converge.

A further disadvantage of these methods that directly control item exposure in an adaptive test is that the test-taker's ability is not considered. These methods may therefore insure, for example, that a particular item is not administered to more than 20% of the test-takers in a target population. However, a more detailed examination may show that this item is administered to 100% of the high ability test-takers, even though it is administered to no more than 20% of the test-takers overall.

Therefore, there exists a need for a method of controlling item exposure in computer based testing that is robust and thus not limited by test specification or item pool, that can be used quickly and efficiently to define exposure control parameters, and is further adaptable to be conditional upon varying levels of test-taker ability.

SUMMARY OF THE INVENTION

The present invention fulfills these needs by providing a method and system for controlling item exposure in a computer based test, and in particular, in a computer adaptive test. The method according to the invention includes ordering the items in the item pool to form an item list based on at least some defined criteria so that the items are listed from most desirable to least desirable to administer. After ordering the items, a set of operant probabilities is generated. The operant probabilities have a one-to-one correspondence with each item in the item pool and are indicative of the probability that the corresponding item is administered given that all of the items being more desirable are not administered first. An item is then randomly selected for administration based upon the set of operant probabilities.

Preferably, each of the items from the item list that is more desirable than the current item is removed from the item list. The current item is then administered and the remaining items are reordered to form an updated item list in which the items are ordered from most desirable to least desirable to administer. A new set of operant probabilities having a one-to-one correspondence with each item in the item pool is regenerated for the new list. The next item for administration is then randomly selected based upon the set of new operant probabilities.

In a preferred embodiment, the step of randomly selecting an item for administration is carried out by generating a cumulative distribution function for the set of operant probabilities such that each item has a cumulative distribution value associated therewith. Then a random number is generated. The item having the lowest cumulative distribution value that is not less than the random number is then selected as the item to administer.

Each operant probability is preferably based on an exposure control parameter for the corresponding item. In a preferred embodiment, a set of exposure control parameters are generated by simulating the computer based test with the random selection of items for administration being based upon the set of operant probabilities. In a more preferable embodiment, at least some of the set of exposure control parameters are initialized with values that are less than one prior to simulating the computer based test.

In another embodiment, the test taker's ability level is estimated based on at least one response provided by the test taker to each administered item. In such an embodiment, the method according to the invention includes defining a number m of ability groups within a predefined population of test takers. One set of exposure control parameters for each of the m ability groups is generated. The test taker is assigned to one of the m ability groups based on each of the test taker's previous responses. Then at least one set of operant probabilities based on the set of exposure control parameters corresponding to the current ability group is generated. The items for administration are then randomly selected based upon the set of operant probabilities generated for each of the current ability groups defined during the course of the computer based test.

Preferably, the operant probabilities are based on a desired measure of test security. In this regard, a measure of test security to be associated with the computer based test is defined and a set of item security parameters having a one-to-one correspondence with each item in the item pool are preferably generated. In such an embodiment, each item security parameter may be based on the measure of test security, the weighted deviation of the corresponding item, and the set of operant probabilities.

In another embodiment of the invention, at least one stimulus is included in the item list. The method according to this embodiment also includes the steps of determining whether or not the current item corresponds to a stimulus and if the current item corresponds to a stimulus, ordering the items in a set of items associated with the stimulus to form the item list based on at least some of the defined criteria so that the items in the set are listed from most desirable to least desirable to administer. A new set of operant probabilities having a one-to-one correspondence with the items in the set is then generated. One of the items in the set is randomly selected to administer based on the new set of operant probabilities.

The present invention also provides a system for controlling item exposure in a computer based test. In particular, the system preferably includes an item selector for selecting the items to administer, an exposure control parameter generator for generating the exposure control parameters used to generate the operant probabilities during the computer based test, and an item administrator for administering the selected item to a test taker on a workstation and for evaluating the test taker's response.

The item selector according to the invention preferably includes an item ordering module for ordering the items in the item pool to form the item list, a generator module interfaced with the item ordering module for generating a set of operant probabilities having a one-to-one correspondence with each item in the item pool, and a random selection module interfaced to at least the generator module for randomly selecting an item for administration based upon the set of operant probabilities.

The exposure control parameter generator according to the invention preferably includes a test simulator for simulating the computer based test using a set of operant probabilities having a one-to-one correspondence with the items in the item pool and an adjustment module interfaced to the test simulator for adjusting the exposure control parameters following each computer based test simulation until the exposure control parameters do not exceed a preselected maximum rate of administration. In a preferred embodiment, the test simulator has an input of exposure control parameters having a one-to-one correspondence with each item in the item pool such that each is representative of the conditional probability that the corresponding item is selected and administered during the simulated computer based test. The test simulator preferably provides an output indicative of the probability of selection associated with each item during the computer based test simulation.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

In accordance with the present invention, the conditional probabilities $P_i(A/S)$ described above are used to generate a different set of probabilities referred to herein as the operant probabilities of administration $k_i$. The operant probabilities are used in the item selection process in contrast to previous methods which directly use the conditional probabilities in selecting the next item to administer. The operant probabilities may be adjusted using security parameters for relaxing or increasing item exposure control. These advantageous features of the invention and others are described below in detail.

Figure 4:
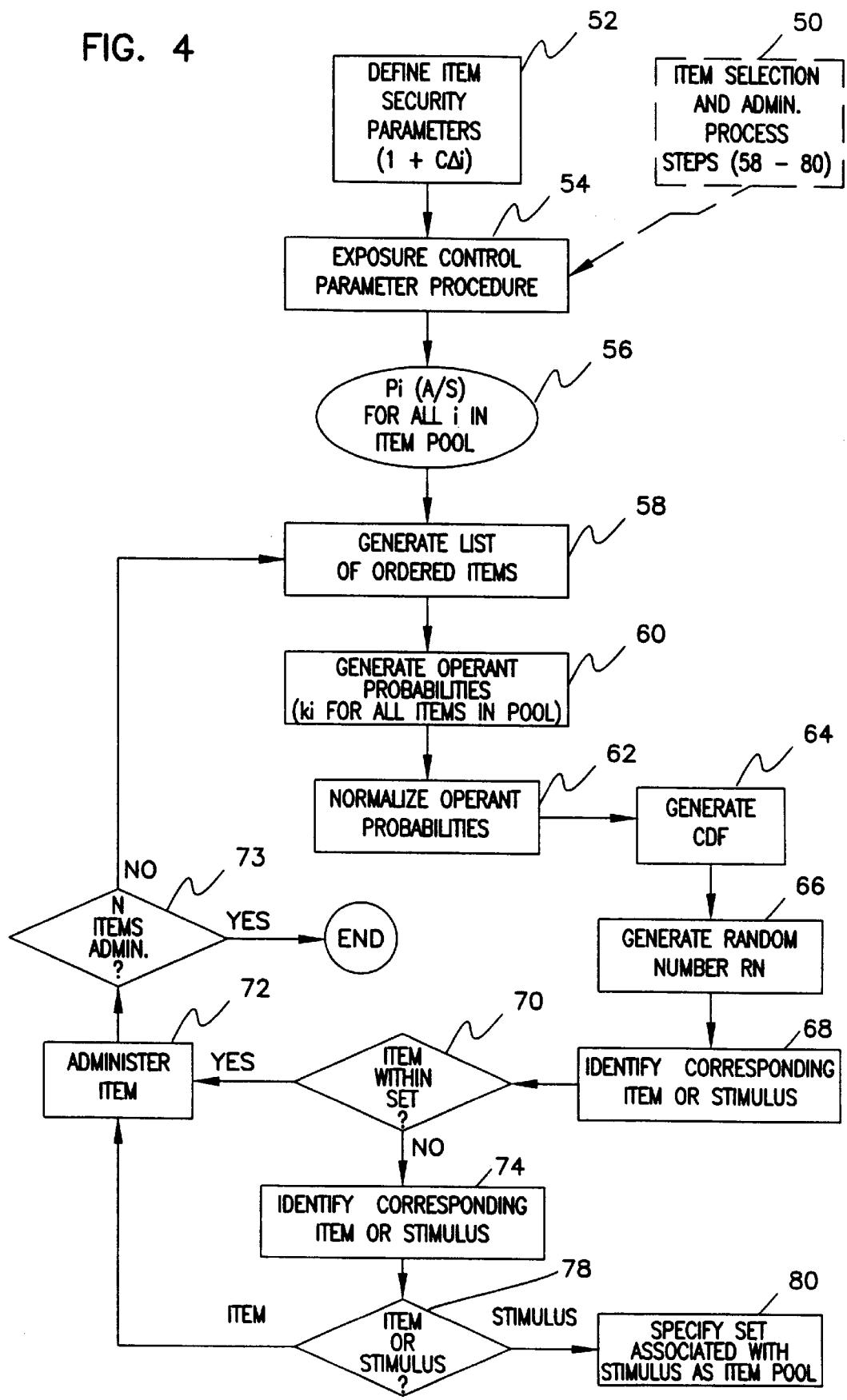
FIG. 4 shows a flow chart of a procedure for directly controlling item exposure in computer based testing in accordance with the present invention.

FIG. 4 shows a flow chart of a procedure for controlling item exposure in computer based testing in accordance with the present invention. In a preferred embodiment, the test designer has the option of determining the balance between test security and administration of items in compliance with the test specification. If the WDM described above is used, item security parameters, $1+C\Delta_i$, may be defined at step 52, where C is a constant representing a measure of test security and $\Delta_i$ is the weight deviation associated with the selected item relative to the previous item in an ordered list of items. The use of the item security parameters is described in detail below. However, it should be understood that the use of item security parameters is merely optional and thus it is not necessary to carry out step 52 in order to practice the invention.

The exposure control parameters $P_i(A/S)$ are generated at step 54 using computer based test simulations with a defined item pool. The generation of the exposure control parameters is preferably based on the method of controlling item exposure shown in steps 58–80 as indicated by the dashed lines at step 50. A detailed description of the procedure used to generate the exposure control parameters in accordance with a preferred embodiment of the invention is described below in connection with FIG. 6. Once a set of exposure control parameters have been generated for each item in the item pool, that set of exposure control parameters is made available as shown at 54 for item selection and administration in actual computer based testing (in contrast to test simulation).

As shown at step 58, a list of ordered items is generated. In computer adaptive testing, the item ordering in step 58 is preferably based on the test taker's previous responses and the particular items in the item pool. For example, the items may be ordered in accordance with the WDM as described above or may be ordered based on other criteria known by those of ordinary skill in the art. A set of operant probabilities $k_i$ for all items i in the pool are then generated at step 60. In general terms, the operant probability $k_i$ is the probability that the corresponding item is administered given that all of the items that are listed as being more desirable in terms of administration are not administered first. Accordingly, $k_i$ may be defined by the following equation:

$$k_i = P_i(A/S) \prod_{x=1}^{i-1} (1 - P_x(A/S)) \tag{2}$$

In a preferred embodiment the operant probabilities are generated using the item security parameters. This modification to the general procedure is described in detail below.

The operant probabilities $k_i$ may then be normalized at step 62 by first computing the sum S such that:

$$S = \sum_i k_i \tag{3}$$

for all items in the pool. It should be understood, however, if S=1 there is no need to normalize the operant conditional probabilities. However, where S<1, $k_i$ is preferably redefined as follows:

$$k_i = k_i/S \tag{4}$$

This normalization step ensures that a complete adaptive test can be carried out for administration without greatly departing from the test specification. In contrast, Sympson and Hetter in setting the n highest probabilities equal to one, may induce a substantial variation from the test specification in the adaptive test.

Figure 5:
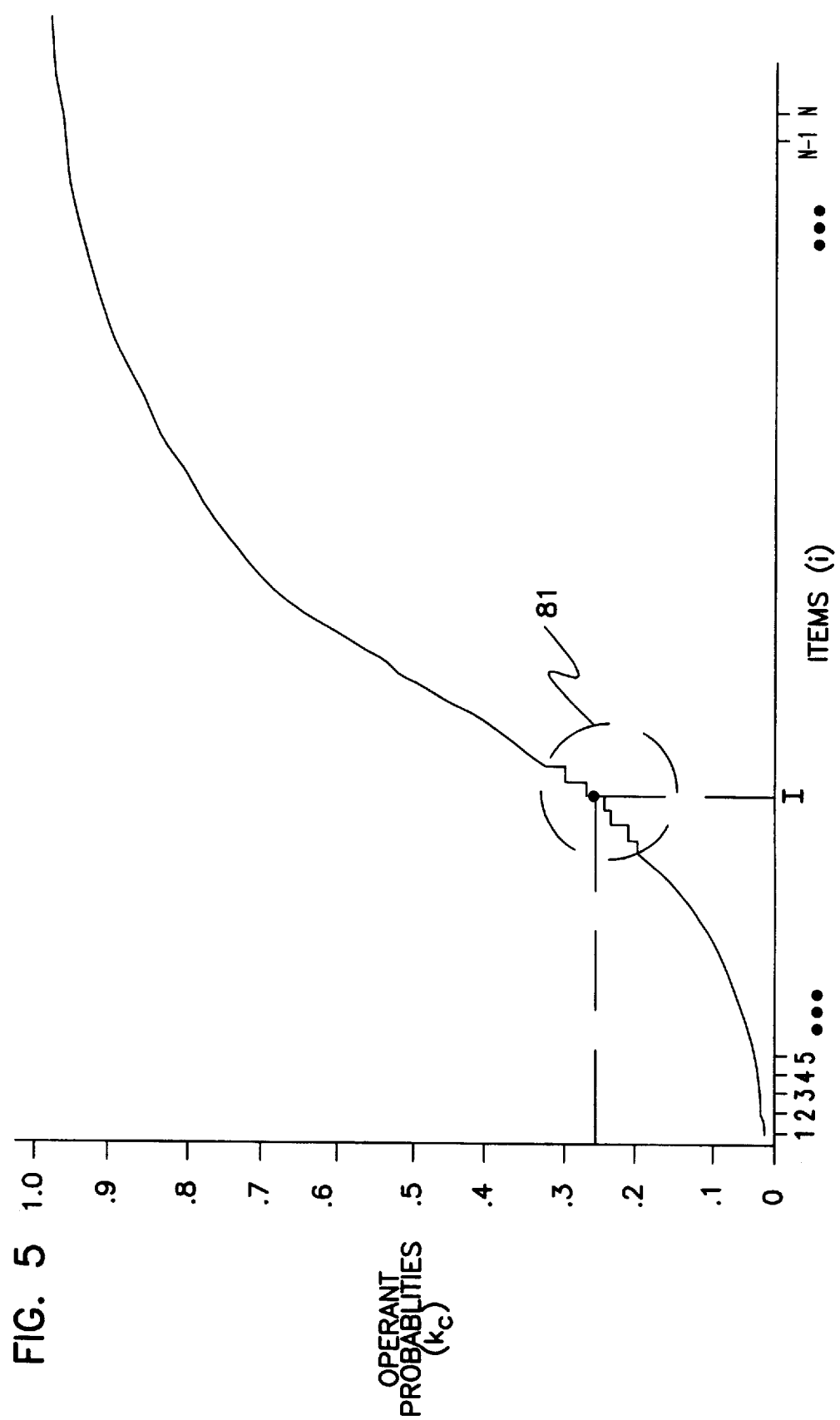
FIG. 5 shows a graphical representation of random item selection in which the item operant probabilities are distributed based on a multinomial distribution.

Once the operant probabilities have been normalized at step 62, a cumulative distribution function (CDF) of the operant probabilities is generated at step 64. The CDF of the operant probabilities corresponding to a large pool of items is plotted in FIG. 5. As shown in FIG. 5, the ordered list of items 1, 2, 3, . . . N are plotted on the X-axis. The magnified portion 81 of the CDF shows the stepped characteristic of the CDF. As the number of items in the item pool increases, the stepped characteristic of the CDF may approximate an S-shaped curve extending from zero to one as shown.

To select an item, a random number RN is generated at step 66. RN may be compared to each successive CDF for each item i until:

$$CDF_{i-1} < RN \leq CDF_i \quad (5)$$

As shown in FIG. 5, the selected item I represents the item corresponding to $CDF_i$ when the relationship (5) is satisfied.

The selected item I, therefore, has a CDF that is closest in value to RN and that is greater than or equal to RN.

At step 70, the selected item is checked to determine whether the item is part of a set of items. In a preferred embodiment, discreet items and stimuli are included in the list of items. Thus if the selected item is a stimulus, the stimulus will refer to a set of items from which the next item is selected. If the selected item is not part of a set, all of the previous items in the item list, i.e., those items deemed more desirable than the selected item based on the listing, are removed from the item pool at step 74. The selected item is then preferably checked at step 78 to determine whether that item is a discrete item or a stimulus. If the selected item is a discreet item, that item is administered and removed from the item pool for the current test taker as shown at step 72. The procedure is repeated for the remaining items in the pool until n items have been administered as determined at step 73.

If the selected item is a stimulus as determined at step 78, the set of items associated with that stimulus in the item pool are then specified at step 80. The procedure is then repeated with respect to only those items in the set of items associated with the stimulus. In a preferred embodiment step 74 is not carried for items in the set because the set of items is generally not large enough to justify removal of items during the administration of the test. However, it should be understood that sets can be designed to include enough items to justify removing items as specified at step 74. Moreover, while steps 78 and 80 are not shown to be carried out while items in a set are being administered, it should be understood that nested stimuli and thus nested sets are possible in accordance with the invention. In such an embodiment steps 78 and 80 would be carried out for items in the set.

As mentioned above, the test designer in accordance with a preferred embodiment of the present invention, has the capability to further increase or decrease the exposure of an item by selection of an appropriate value C, the measure of test security. Increasing the item's exposure may result in a test that more closely complies with the test specification, whereas decreasing the item's exposure may result in a test that deviates more from the test specification.

This feature is preferably implemented in the present invention as follows. Each probability that a more desirable item than the selected item I is selected but rejected for administration (1-P(A/S)), can be raised to the power of $(1+C\Delta_i)$ when forming the operant probabilities $k_i$. As stated above, C is a measure of the test security and is a constant. The parameter $\Delta i$ is, for example, in the WDM, the weighted deviation of the selected item relative to the previous (i.e., more desirable) item in the list. However, in more general terms $\Delta_i$ may merely represent the difference between the selected item and the previous or more desirable item in the list.

Table 1 below provides an example that shows the effect of this procedure. The top part of the table provides information about five hypothetical items. The weighted deviations and the relative weighted deviations are listed in the second and third columns, respectively. The probabilities of administration and rejection of each item, given the item is selected are in the remaining two columns. The next three parts of Table 1 show the effect on the cumulative multinomial distribution when the measure of test security used in the exponents of the probabilities of rejection are C=0, C=0.5, and C=1.0 respectively.

The entries for C=1, for example, are computed as follows:

$k_1 = 0.10$
$k_2 = (0.9^{(1+6)}) (0.14) = 0.07$
$k_3 = (0.9^{(1+6)}) (0.86^{(1+1)}) (0.14) = 0.05$
$k_4 = (0.9^{(1+6)}) (0.86^{(1+1)}) (0.86^{(1+0)}) (0.16) = 0.05$
$k_5 = (0.9^{(1+6)}) (0.86^{(1+1)}) (0.86^{(1+0)}) (0.84^{(1+1)}) (0.22) = 0.05$

The sum S of these five operant probabilities is 0.32. The adjusted probabilities are obtained by dividing each operant probability by this sum, that is, 0.10/0.32, 0.07/0.32, 0.05/0.32, and so forth. The cumulative probabilities are obtained by successive addition of the normalized operant probabilities.

The probability of selecting the most desirable item, in this example, which also has the lowest exposure control parameter, rises from 0.18 when relative weighted deviations are not emphasized further (C=0), to 0.24 when they are emphasized a moderate amount (C=0.5), to 0.31 when they are emphasized more heavily (C=1). By increasing the coefficient C, the test designer can increase the influence of the weighted deviations (i.e. comply more strictly with the test specification) on the selection of each item at the expense of increasing the exposure of desirable items.

TABLE 1

| Item | Weighted Deviations | Relative Deviations ($\Delta$) | P(A/S) | 1 - P(A/S) |
|---|---|---|---|---|
| 1 | 0 | — | .10 | .90 |
| 2 | 6 | 6 | .14 | .86 |
| 3 | 7 | 1 | .14 | .86 |
| 4 | 7 | 0 | .16 | .84 |
| 5 | 8 | 1 | .22 | .78 |
| C = 0 | | | | |
| Item | $k_i$ | Adjusted | Cumulative | |
| 1 | .10 | .18 | .18 | |
| 2 | .13 | .23 | .41 | |
| 3 | .11 | .19 | .60 | |
| 4 | .11 | .19 | .79 | |
| 5 | .12 | .21 | 1.00 | |
| C = .5 | | | | |
| Item | $k_i$ | Adjusted | Cumulative | |
| 1 | .10 | .24 | .24 | |
| 2 | .09 | .22 | .46 | |
| 3 | .07 | .17 | .63 | |
| 4 | .07 | .17 | .80 | |
| 5 | .08 | .20 | 1.00 | |
| C = 1 | | | | |
| Item | $k_i$ | Adjusted | Cumulative | |
| 1 | .10 | .31 | .31 | |
| 2 | .07 | .22 | .53 | |
| 3 | .05 | .16 | .69 | |
| 4 | .05 | .16 | .84 | |
| 5 | .05 | .16 | 1.00 | |

Figure 3:
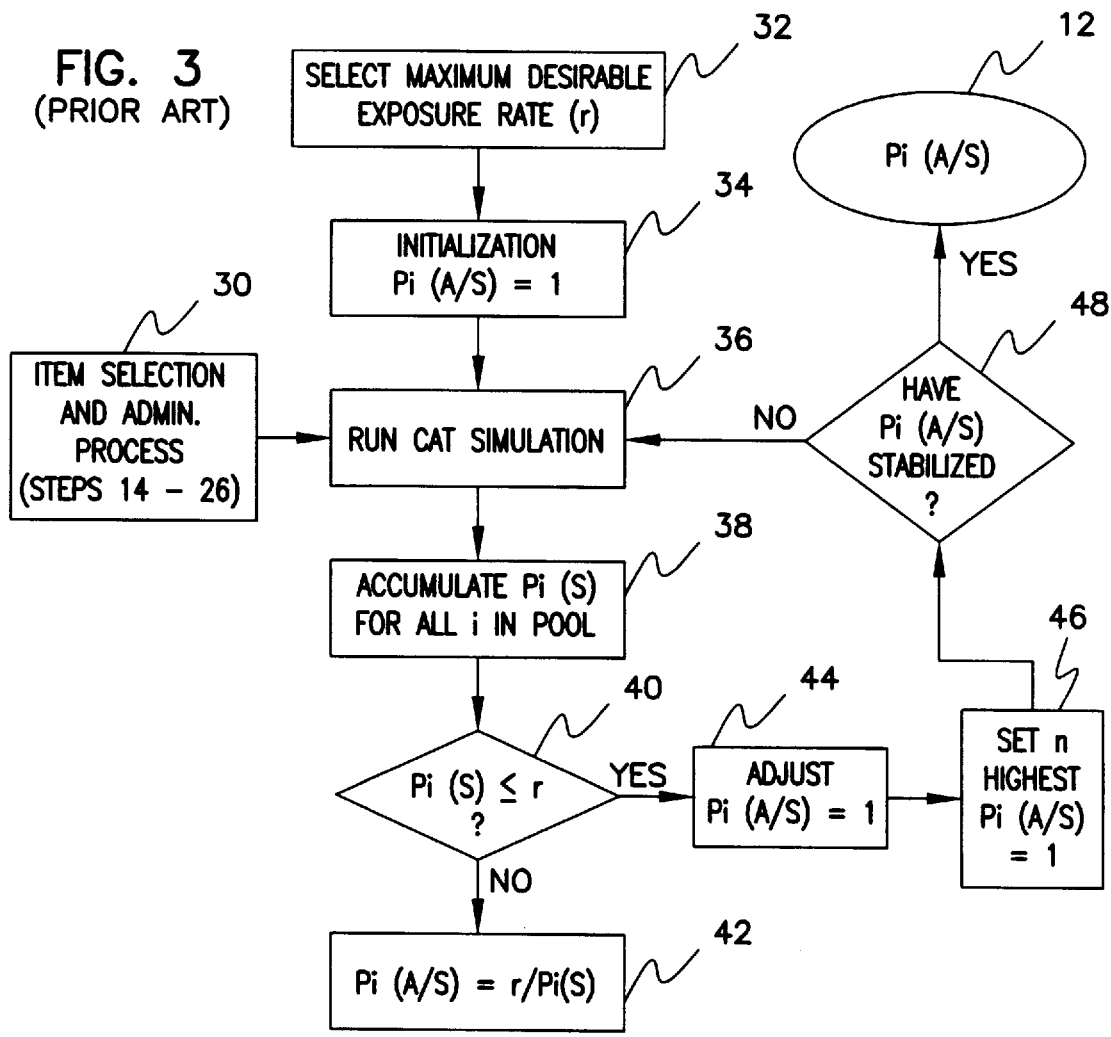
FIG. 3 shows a flow chart of one procedure for generating exposure control parameter according to the prior art.
Figure 6:
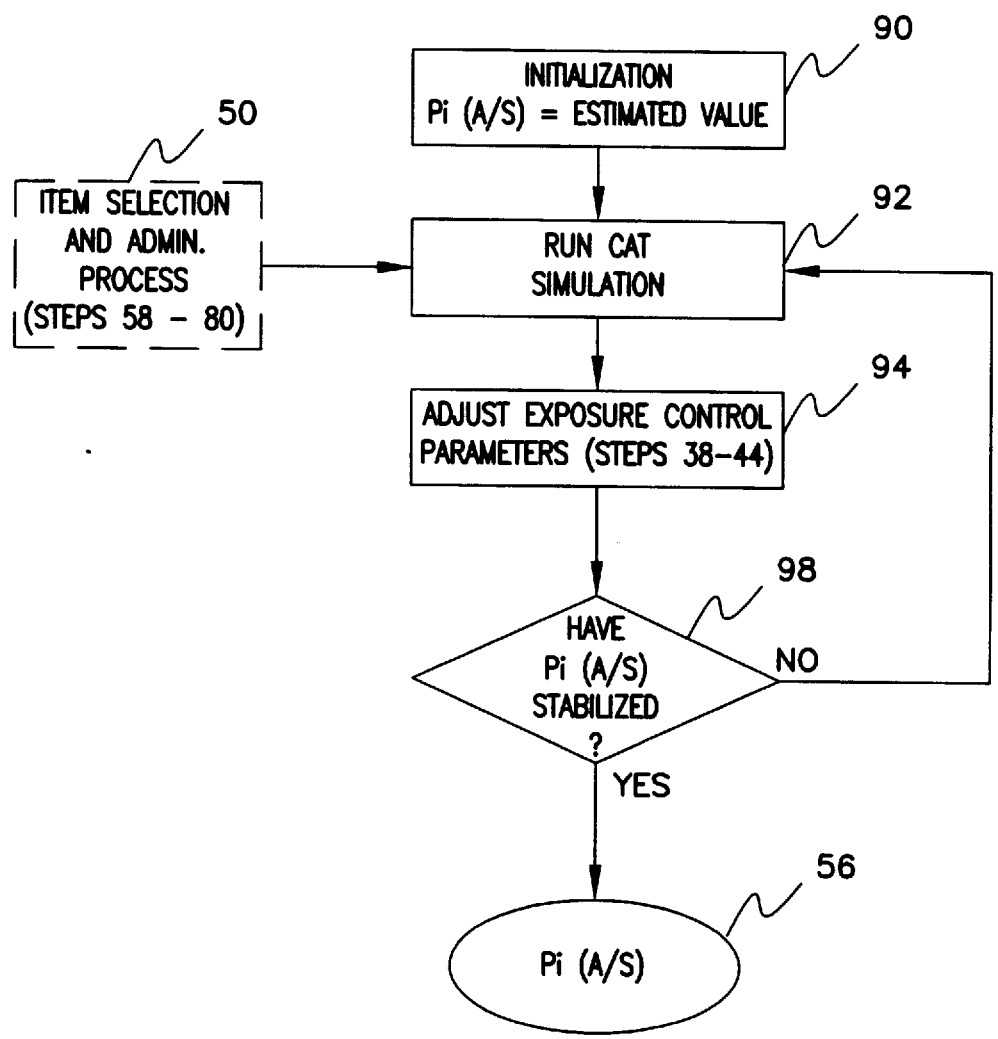
FIG. 6 shows a flow chart for generating exposure control parameters in accordance with the present invention.

FIG. 6 shows a flow chart of a procedure for generating the exposure control parameters $P_i(A/S)$ depicted at step 54 in FIG. 4. Unlike prior procedures for controlling item exposure, these exposure control parameters are not initialized to one, but rather initialized to other values based on the test designer's specialized knowledge of the items in the item pool. As shown at step 90, the exposure control parameters $P_i(A/S)$ are initialized to a predetermined estimated value less than or equal to 1. The computer based test simulations are then run in accordance with steps 58–80 as shown in FIG. 4 (indicated as dashed lines depicting step 50) and as indicated at step 92 in FIG. 6. The exposure control parameters are preferably adjusted following each simulation at step 94 in accordance with steps 38–44 shown in FIG. 3. Note these adjustment steps are those used in the Sympson and Hetter procedure. This process is repeated until the exposure control parameters have stabilized as determined at step 98. Once the exposure control parameters have been stabilized, the set of exposure control parameters is available at step 56 for the item selection and administrative process set forth in FIG. 4.

This procedure provides a smaller adjustment to the conditional probability $P_i(A/S)$ than the Sympson and Hetter procedure in order to maximize the likelihood that a complete adaptive test can be administered. The iterative adjustment simulations to determine $P_i(A/S)$ are therefore more likely to converge smoothly to values that appropriately reflect the intended population of test-takers. At the same time this new procedure retains the advantage of the Sympson and Hetter procedure in that it provides direct control over $P_i(A)$ for each item when adaptive tests are drawn for administration to the intended population.

While the procedure in accordance with the present invention does not eliminate all disadvantages associated with the time consuming iterative adjustments through simulations for pools and test specifications with complex structures, it does provide a quicker and more efficient means for stabilizing the exposure control parameters as compared with the prior art. In particular, this advantage is largely accomplished through the accurate estimation of values for $P_i(A/S)$ in the initialization step 90 which directly decreases the time for convergence.

The unconditional multinomial method described above results in an exposure control parameter, $P_i(A/S)$, for each element i in a pool. The adjustment phase develops these $P_i(A/S)$ in reference to a particular distribution of ability $\theta$ in a relevant population of test-takers.

An approach to developing a conditional version of the multinomial method is to consider the range of $\theta$ covered by the distribution of ability of possible test takers, and divide this range into m different discrete values of $\theta_m$ that cover the range of interest. Iterative adjustment simulations can be performed to develop exposure control parameters for each element i in the pool using the multinomial procedure and in reference to only those simulees drawn that have true ability equal to $\theta_m$. It should be understood that there can be as many simulees as desired whose true ability is $\theta_m$. Accordingly, for each level $\theta_m$, a set of exposure control parameters is preferably generated resulting in an i×m matrix or array of exposure control parameters $P_{im}(A/S)$.

Figure 7:
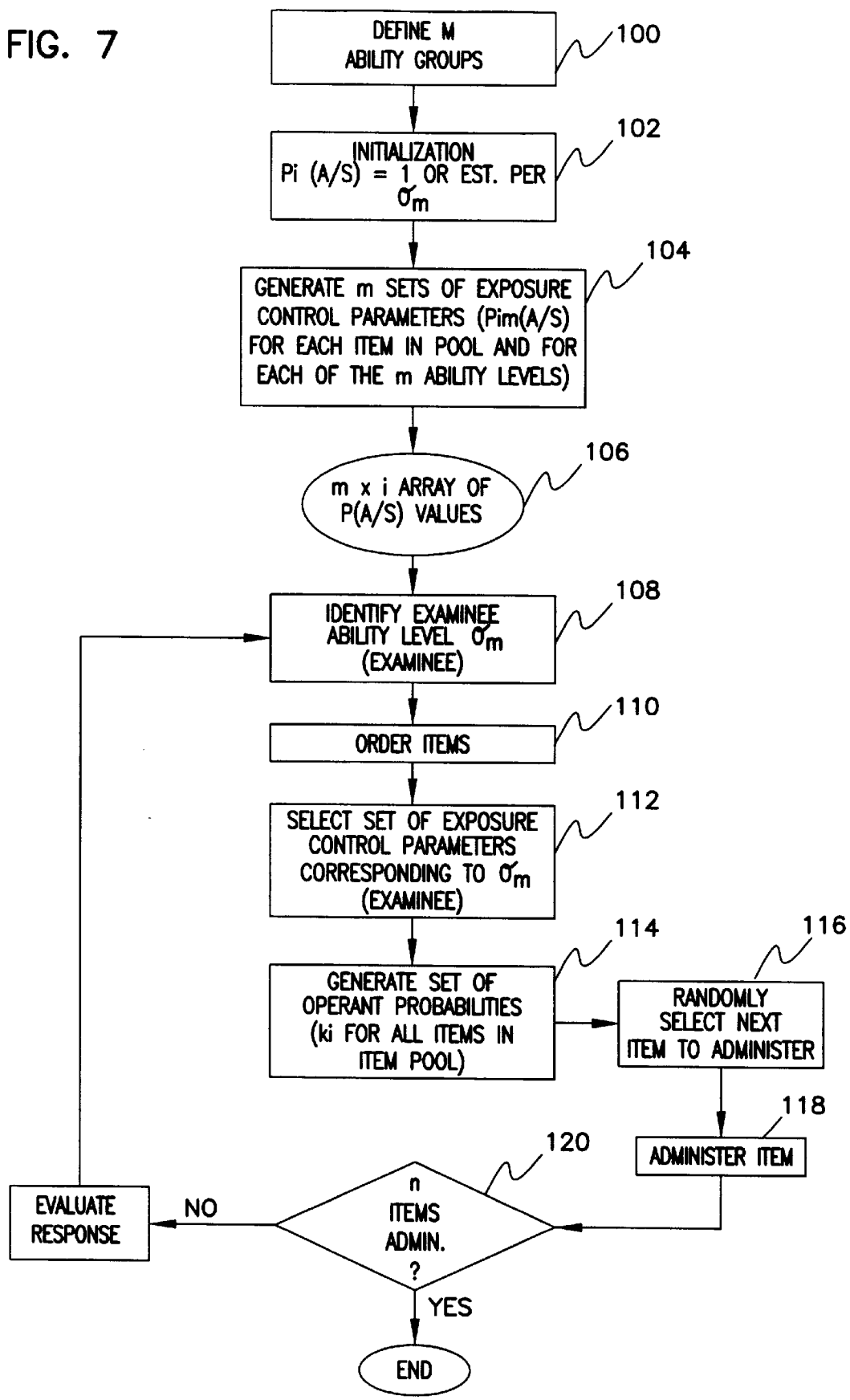
FIG. 7 shows a flow chart of a procedure for controlling item exposure conditioned on the level of ability of the test taker in accordance with the present invention.

FIG. 7 shows a flow chart of a procedure for controlling item exposure conditional upon ability level of the test taker in accordance with the present invention. As shown at step 100, m levels of ability $\theta_m$ are defined. The exposure control parameters $P_{im}(A/S)$ are initialized at step 102. As discussed above the exposure control parameters may be set equal to 1 for initialization, but more preferably are set to values that are estimated to be representative of the final converging values. m sets of exposure control parameters are then generated at step 104 forming an array of exposure control parameters $P_{im}(A/S)$ at 106. Like the unconditional multinomial method described above, each set of exposure control parameters is preferably generated through iterative simulations of the computer based test with adjustments made until the set of exposure control parameters has stabilized. In other words, the procedure shown in FIG. 6 is preferably carried out to generate each of the m sets of exposure control parameters at step 104.

At step 108, the test taker's ability level $\theta_m$ is determined. When the computer based test is first initiated in adaptive testing, all test takers are typically assumed to have average ability, e.g., the median $\theta_m$. After each response, as is discussed below, test takers' abilities are assessed and become differentiated.

The items in the item pool are then ordered at step 110 according to predefined criteria such as those associated with the WDM as explained above. In computer adaptive testing the ordering is also based on the test taker's previous responses. The set of exposure control parameters $P_{im}(A/S)$ associated with the ability level of the test taker is selected at step 112 and corresponds to the test taker's ability $\theta_m$ identified in step 108. Using the selected set of exposure control parameters, a set of operant probabilities $k_i$ is generated as discussed above in connection with step 60 in FIG. 4. The next item to administer is randomly selected at step 116. Preferably, this random selection is carried out by steps 62, 64, 66, and 68 as described above in connection with FIG. 4. However, it should be understood that other procedures for item selection may be used for item exposure control conditional on ability level.

The selected item is then administered at step 118. Preferably the item is administered in accordance with steps 70, 74, 78, 80 and 72 described above in connection with FIG. 4. When at least n items, the desired length of the test, have been administered, the computer based test is complete as determined at step 120. However, if less than n items have been administered, then the test taker's ability level $\theta_m$ is reevaluated based on the test taker's last response as shown at step 172. This procedure is then preferably repeated until n items have been administered.

It should be understood that as the number m increases, the more iterative simulations must be run to generate all of the sets of exposure control parameters. However, larger values of m also result in better item exposure control overall. Thus m should be selected by the test designer by balancing the need for item exposure control with the drawback of having to generate multiple sets of exposure control parameters through the iterative process.

Figure 8:
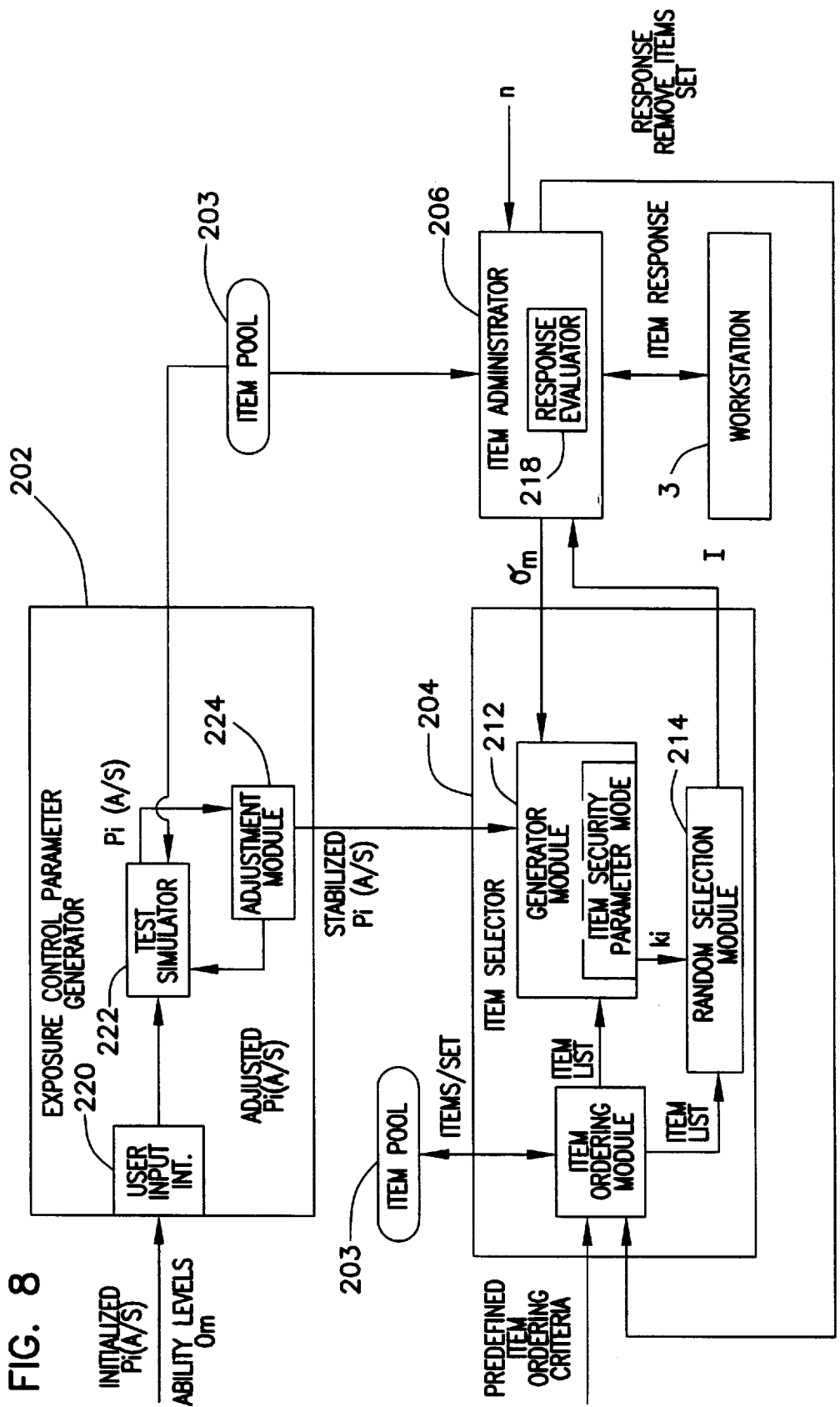
FIG. 8 shows a block diagram of a system for controlling item exposure in computer based testing in accordance with the present invention.

FIG. 8 shows a block diagram of a system for controlling item exposure in computer based testing in accordance with the present invention. An exposure control parameter generator 202 generates the set or sets of exposure control parameters for use during item selection and administration during an actual computer based test. An item selector 204 generates operant probabilities and selects the next item to be administered based on the operant probabilities. An output representative of the selected item I is output from the item selector to the item administrator 206 which administers the selected item I as discussed below.

In a preferred embodiment, the item selector comprises an item ordering module 210, a generator module 212, and a random selection module 214. The item ordering module is adapted to receive an input of predefined criteria to be used in the item ordering process described above. Alternatively, the item ordering module may be preprogrammed with such information. The item ordering module is preferably interfaced with the item pool 203 which is defined by the test designers, also explained above. The items in the item pool are ordered by the item ordering module and an item list is provided as an input to the generator module 212.

The generator module receives an input of exposure control parameters associated with each item i provided by the exposure control parameter generator. The generator module uses the item list and the exposure control parameters to generate the operant probabilities as described above.

In a preferred embodiment, the generator module includes an item security parameter module 216. The measure of test security may be provided as an input or preprogrammed in this module. According to this embodiment, the item ordering module also preferably provides the item deviations $\Delta_i$. Alternatively, the list of ordered items i may include information from which $\Delta_i$ may be derived by the item security parameter generator. The item security parameter module generates an item security parameter for each item in the ordered list of items based on the measure of test security and the item deviation as explained above. The generator module, in this preferred embodiment, then uses the item security parameters in generating the operant probabilities as also explained above.

Figure 9:
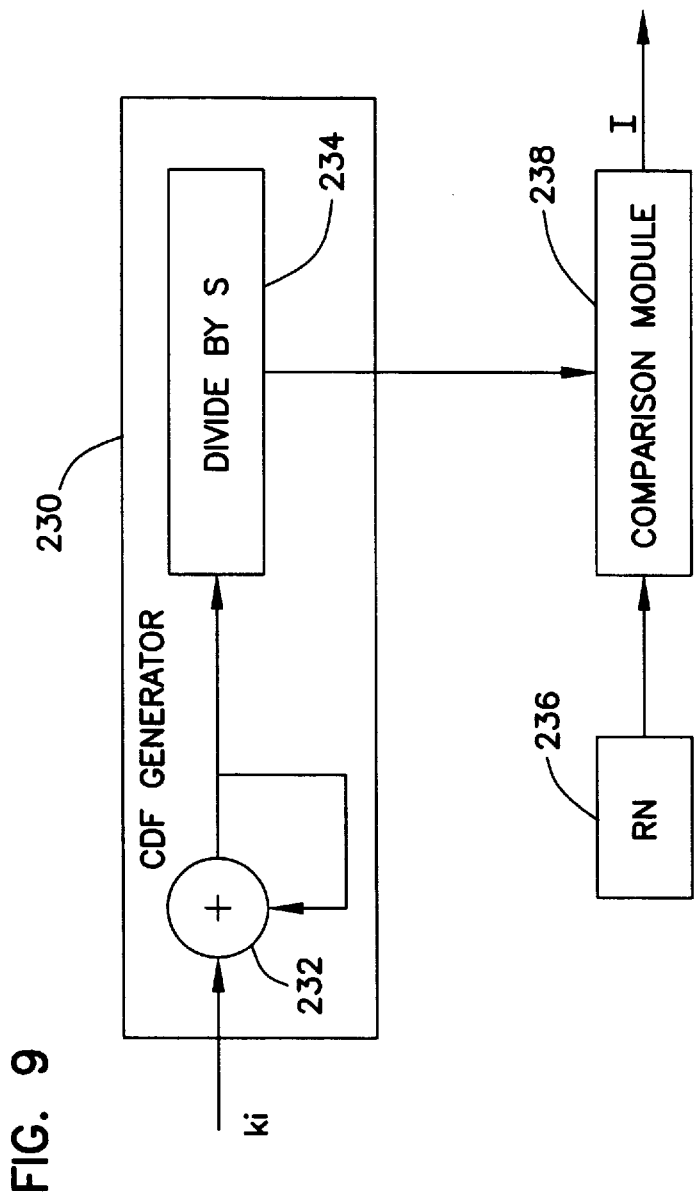
FIG. 9 shows a detailed functional block diagram of an exemplary random selection module in accordance with the present invention.

The operant probabilities are output from the generator module to the random selection module 214. FIG. 9 shows a detailed functional block diagram of an exemplary random selection module in accordance with the present invention. A CDF generator 230 is preferably used to generate the multinomial distribution based on the operant probabilities. In one possible embodiment of the CDF generator, the operant probabilities are accumulated one by one by an accumulator 232. Each CDF value is then normalized by the sum S using a divide by S circuit or program instruction 230. It should be understood, that each CDF value could be buffered in the accumulator until a final sum S of all the operant probabilities has been determined before the CDF values are normalized. The normalized CDF values are output to comparison module 238. A random number generator 236 outputs a random number also to the comparison module. The comparison module may compare, for example, consecutive normalized CDF values with the random number to identify the CDF closest in value to the random number but not less than the random number, i.e., $CDF_{i-1} < RN \leq CDF_i$. The comparison module may also receive an input of the list of ordered items so that the item corresponding to the identified CDF ($CDF_i$) can be identified as the selected item I and output to the item administrator. It should be understood that numerous implementations of the random selection module are possible.

Referring back to FIG. 8, the selected item is presented to the test taker at the work station 3 by the item administrator. The item administrator provides an output to the item selector indicating the items, if any, to be removed from the item pool. The item ordering module preferably receives this output and removes those items from the item pool before ordering the items for the next item selection. The test taker's response is received by the item administrator which provides an output indicative of the response to the item selector to be used in the ability estimation and item ordering process. This output is also preferably received by the item ordering module which evaluates the response in relation to the predefined criteria before ordering the items for the next item selection. If the selected item is not administered, for example, because it is a stimulus, the item administrator provides an output to the item selector identifying the stimulus or the set of items that corresponds to the selected stimulus. The item ordering module preferably receives this output as well and inputs the set of items identified by the stimulus from the item pool 203.

It should be understood that the number of items to administer n can be selected in advance through trial and error. Once n has been determined it can be provided as an input to the item administrator as shown in FIG. 8.

In a preferred embodiment, the item administrator includes a response evaluator 218 that evaluates the test taker's ability level $\theta_m$ for use by the item selector in selecting the next item to be administered. The ability level $\theta_m$ is preferably output to the generator module so that the appropriate exposure control parameters are selected as explained above in generating the operant probabilities $P_{im}(A/S)$.

The exposure control parameter generator 202 preferably includes a test simulator 222 and an adjustment module 224. The test simulator receives an input of initialized exposure control parameters and the simulates a computer based test with the items from item pool 203 to provide an output of the probability of selection for each item in the item pool. As explained in connection with FIG. 6, the probability of selection for each item is used to determine whether or not an adjustment to the item's exposure control parameter is required based on a desired maximum rate of administration r. Thus the adjusted exposure control parameters are output from the adjustment module to the test simulator to undergo further test simulation. When the adjustment module determines that the exposure control parameters have stabilized, the exposure control parameters are then made available by the exposure control parameter generator for use in actual testing, i.e. by downloading to a test center or saving them to a file to be used in connection with the computer based test.

In a preferred embodiment, the exposure control parameters are initialized by a test designer to more closely approximate their stabilized values as described above. Accordingly, a user input interface 220 may be provided to accept initialized exposure control parameters from a test designer. In a more preferred embodiment, the test designer may also designate m ability levels and define the ability levels $\theta_m$. Thus the user input interface may also be adapted to accept $\theta_m$ definition from the test designer. In this preferred embodiment, the exposure control parameter generator is adapted to generate m sets of exposure control parameters $P_{im}(A/S)$ as described above in connection with FIG. 7.

Figure 1:
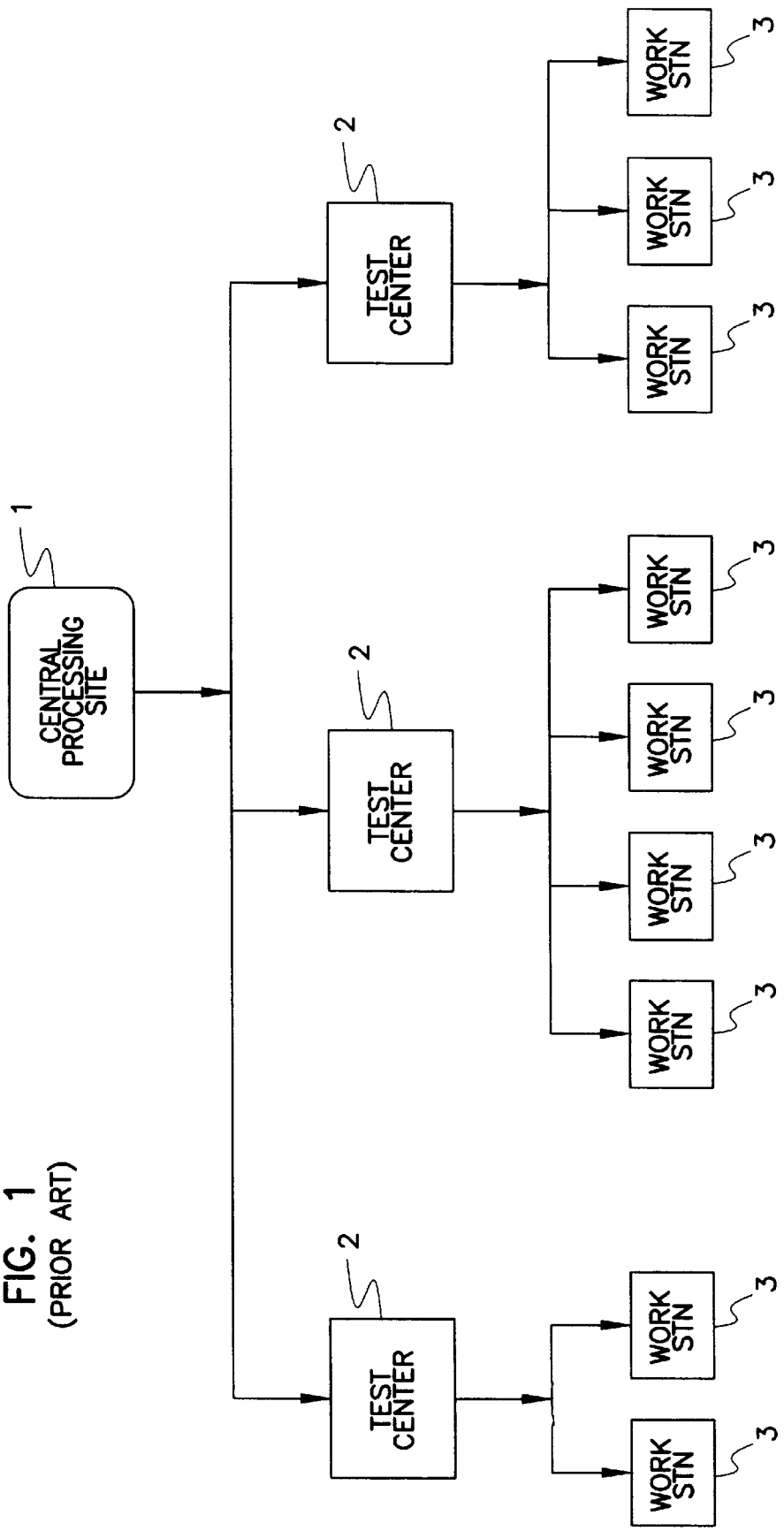
FIG. 1 shows a general overview of computer based testing.
Figure 2:
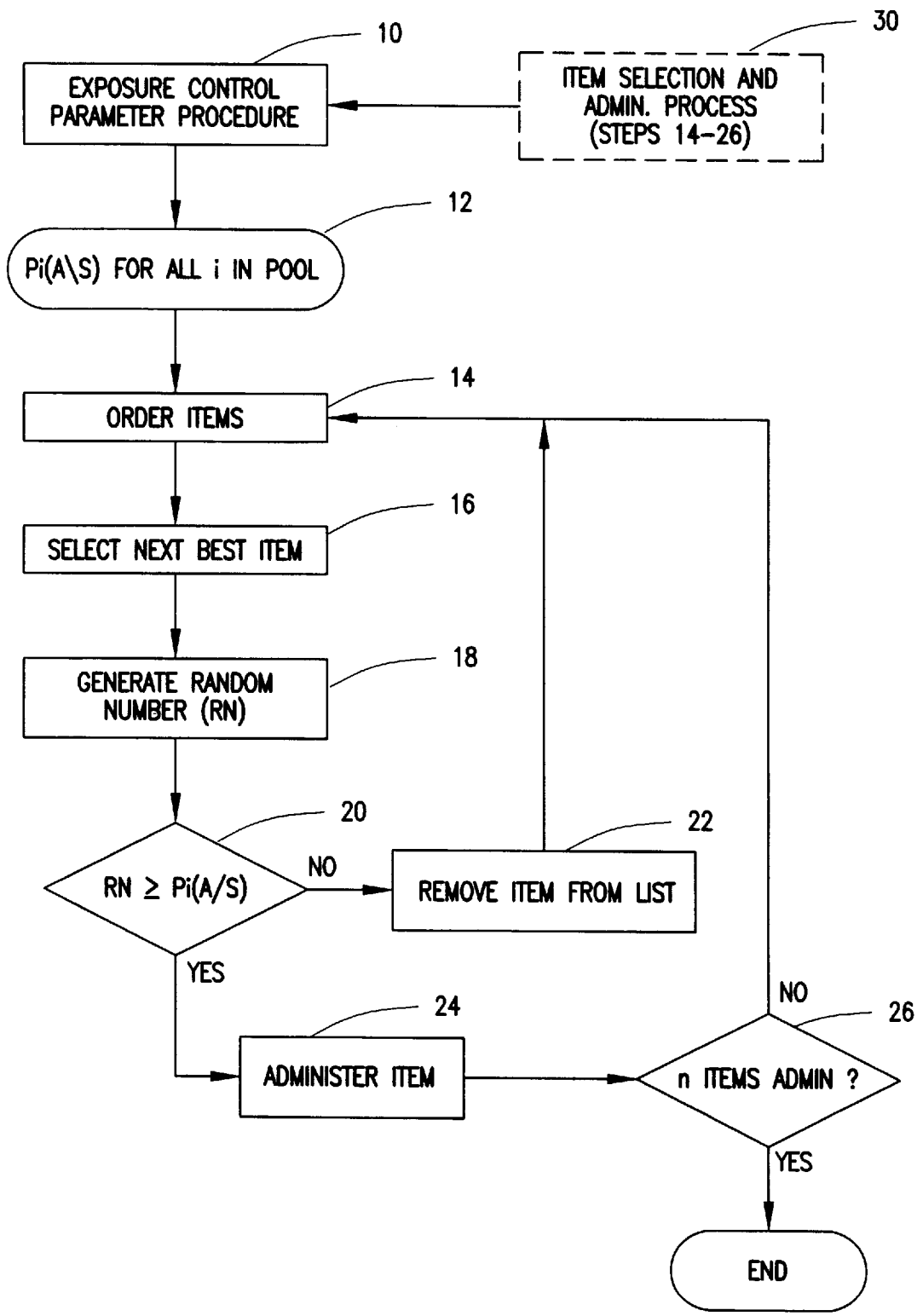
FIG. 2 shows a flow chart of one procedure for directly controlling item exposure in computer adaptive testing according to the prior art.

It should be understood that the item selector and item administrator are preferably included within the test simulator. In a preferred embodiment, the exposure control parameter generator resides on computing systems at the central processing site 1 shown in FIG. 1, e.g., Compaq 486/66 MHz or compatible. Since the item selector and item administrator are used during both test simulation and actual testing, they may reside on computing systems such as personal computers located at both the central processing site 1 and test centers 2. In particular, the item selector and item administrator may be loaded directly into memory of the workstation 3 for actual testing.

While the invention has been described and illustrated with reference to specific embodiments, those skilled in the art will recognize that modification and variations may be made without departing from the principles of the invention as described hereinabove and set forth in the following claims.

We claim:

1. A method of controlling item exposure in a computer based test in which a predetermined number of items selected from an item pool associated with the computer based test are administered to a test taker at a computer workstation, the items being selected for administration based on defined criteria, the method comprising the steps of:

ordering the items in the item pool to form an item list based on at least some of the defined criteria so that the items are listed from most desirable to least desirable to administer;

generating a set of operant probabilities having a one-to-one correspondence with each item in the item pool, each operant probability being indicative of the probability that the corresponding item is administered given that all of the items being more desirable based on the item list are not administered first; and randomly selecting an item for administration based upon the set of operant probabilities and defining said item as the current item.

2. The method of claim 1, further comprising the steps of:

removing each of the items from the item list that are more desirable than the current item:

administering the current item;

reordering the remaining items to form an updated item list in which the items are ordered from most desirable to least desirable to administer based on said at least some of the defined criteria;

generating a new set of operant probabilities having a one-to-one correspondence with each item in the item pool and being indicative of the probability that the corresponding item is administered given that all of the items being more desirable are not administered first; and randomly selecting an item for administration based upon the set of new operant probabilities and defining said item as the current item.

3. The method of claim 1, wherein the step of randomly selecting an item for administration comprises the steps of:

generating a cumulative distribution function for the set of operant probabilities such that each item has a cumulative distribution value associated therewith;

generating a random number: and selecting the item having the lowest cumulative distribution value that is not less than the random number as the current item.

4. The method of claim 1, wherein each operant probability is based on an exposure control parameter for the corresponding item, the exposure control parameter being indicative of the probability that the item is administered given that the item is selected, the method further comprising the steps of:

generating a set of exposure control parameters by simulating the computer based test with the random selection of items for administration being based upon the set of operant probabilities.

5. The method of claim 4, wherein at least some of the set of exposure control parameters are initialized with values that are less than one prior to simulating the computer based test.

6. The method of claim 4, wherein the test taker's ability level is estimated based on at least one response provided by the test taker to each administered item, the method further comprising the steps of:

defining a number m of ability groups within a predefined population of test takers;

generating one set of exposure control parameters for each of the m ability groups;

assigning the test taker to one of the m ability groups based on each of the test taker's previous responses and defining said ability group as the current ability group;

generating at least one set of operant probabilities based on the set of exposure control parameters corresponding to the current ability group; and randomly selecting the items for administration based upon the set of operant probabilities generated for each of the current ability groups defined during the course of the computer based test.

7. The method of claim 1, wherein the administration of items to the test taker is dependent upon the test taker's ability.

8. The method of claim 1, wherein at least one of the defined criteria is based on a weighted deviation model such that each item in the item pool has a corresponding weighted deviation relative to the next most desirable item in the item list, the method further comprising the steps of:

defining a measure of test security to be associated with the computer based test;

generating a set of item security parameters have a one-to-one correspondence with each item in the item pool, each item security parameter being based on the measure of test security and the weighted deviation of the corresponding item; and said set of operant probabilities being additionally generated based on the set of item security parameters.

9. The method of claim 1, wherein at least one stimulus is included in the item list, the method further comprising the steps of:

determining whether or not the current item corresponds to a stimulus;

if the current item corresponds to a stimulus, ordering the items in a set of items associated with the stimulus to form the item list based on at least some of the defined criteria so that the items in the set are listed from most desirable to least desirable to administer;

generating a new set of operant probabilities having a one-to-one correspondence with the items in the set; and randomly selecting one of the items in the set to administer based on the new set of operant probabilities.

10. The method of claim 1, wherein the distribution of the set of operant probabilities is a multinomial distribution.

11. The method of claim 1, wherein the computer based test is a computer adaptive test.

12. The item selector of claim 1, wherein the computer based test is a computer adaptive test.

13. The method of claim 1, wherein the operant probabilities, $k_i$, are defined by the following relationship:

$$k_i = P_i(A/S) \prod_{x=1}^{i-1} (1 - P_x(A/S))$$

wherein $P(A/S)_i$ is the probability that the ith item in the item list is administered given that the same item is selected.

14. In a system for controlling item exposure in a computer based test in which a predetermined number of items selected from an item pool associated with the computer based test are administered to a test taker at a computer workstation, the items being selected for administration based on defined criteria, the system having an item selector comprising:

an item ordering means for ordering the items in the item pool to form an item list based on at least some of the defined criteria so that the items are listed from most desirable to least desirable to administer;

a generator means interfaced with the item ordering means for generating a set of operant probabilities having a one-to-one correspondence with each item in the item pool, each operant probability being indicative of the probability that the corresponding item is administered given that all of the items being more desirable based on the item list are not administered first; and a random selection means interfaced to at least the generator means for randomly selecting an item for administration based upon the set of operant probabilities and defining said item as the current item.

15. The item selector of claim 14, wherein the random selection means comprises:

an accumulator for generating a cumulative distribution function for the set of operant probabilities such that each item has a cumulative distribution value associated therewith;

a random number generator for generating a random number: and a comparison means for comparing the cumulative distribution values associated with each item with the random number and selecting the item having the lowest cumulative distribution value that is not less than the random number as the current item.

16. The method of claim 14, wherein the set of operant probabilities generated by the generator means depend upon the test taker's ability level.

17. The method of claim 14, wherein a measure of test security is defined and wherein a relative difference between the desirability of the current item and a more desirable item in the item list defines an item deviation, the generator means comprising:

item security generator means for generating a set of item security parameters have a one-to-one correspondence with each item in the item pool, each item security parameter being based on the measure of test security and the item deviation of the corresponding item; and said set of operant probabilities being additionally generated by the generator means based on the set of item security parameters.

18. The item selector of claim 14, wherein the item lists includes both discrete items and at least one stimulus.

19. The item selector of claim 14, wherein the distribution of the set of operant probabilities is a multinomial distribution.

20. The system of claim 14, wherein the operant probabilities, $k_i$, are defined by the following relationship:

$$k_i = P_i(A/S) \prod_{x=1}^{i-1} (1 - P_x(A/S))$$

wherein $P(A/S)_i$ is the probability that the ith item in the item list is administered given that the same item is selected.

21. In a system for controlling item exposure in a computer based test in which a predetermined number of items selected from an item pool associated with the computer based test are administered to a test taker at a computer workstation, the items being selected for administration based on defined criteria, the system having an exposure control parameter generator comprising:

a test simulation means for simulating the computer based test using a set of operant probabilities having a one-to-one correspondence with the items in the item pool, each operant probability being indicative of the probability that the corresponding item is administered given that all more desirable items based on the predefined criteria are not administered first, the test simulator having an input of exposure control parameters having a one-to-one correspondence with each item in the item pool and each being indicative of the conditional probability that the corresponding item is selected and administered during the simulated computer based test and providing an output indicative of the probability of selection associated with each item during the computer based test simulation; and an adjustment means interfaced to the test simulation means for adjusting the exposure control parameters following each computer based test simulation until the exposure control parameters do not exceed a preselected maximum rate of administration.

22. The item exposure parameter generator of claim 21, further comprising:

input means for accepting an input of initialized exposure control parameters for use in a first computer based test simulation, at least some of the initialized exposure control parameters having a value less than one.

* * * * *